United States Patent
Nishiyama et al.

(10) Patent No.: US 11,579,612 B2
(45) Date of Patent: Feb. 14, 2023

(54) POSITION AND ATTITUDE ESTIMATION APPARATUS AND POSITION AND ATTITUDE ESTIMATION METHOD

(71) Applicants: Kabushiki Kaisha Toshiba, Tokyo (JP); Toshiba Electronic Devices & Storage Corporation, Tokyo (JP)

(72) Inventors: Manabu Nishiyama, Setagaya Tokyo (JP); Yutaka Oki, Ome Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 136 days.

(21) Appl. No.: 16/811,084

(22) Filed: Mar. 6, 2020

(65) Prior Publication Data
US 2021/0041875 A1    Feb. 11, 2021

(30) Foreign Application Priority Data
Aug. 6, 2019   (JP) .............................. JP2019-144616

(51) Int. Cl.
G05D 1/02   (2020.01)
B60W 40/02   (2006.01)
B60W 50/14   (2020.01)

(52) U.S. Cl.
CPC .............. *G05D 1/021* (2013.01); *B60W 40/02* (2013.01); *B60W 50/14* (2013.01); *B60W 2050/143* (2013.01); *B60W 2050/146* (2013.01)

(58) Field of Classification Search
CPC ...... G05D 1/021; B60W 40/02; B60W 50/14; B60W 2050/143; B60W 2050/146
See application file for complete search history.

(56) References Cited

U.S. PATENT DOCUMENTS 4,013,301 A  *  3/1977  Gaskin ..................... B62D 7/02
                                                          74/484 R
4,819,187 A  *  4/1989  Yasue ................... F16H 63/502
                                                             701/99
(Continued)

FOREIGN PATENT DOCUMENTS

JP    2006-317287 A    11/2006
JP    2007-114020 A    5/2007
(Continued)

*Primary Examiner* — Fadey S. Jabr
*Assistant Examiner* — Naeem Taslim Alam
(74) *Attorney, Agent, or Firm* — Allen & Overy LLP (57) ABSTRACT

A position and attitude estimation apparatus includes sub-sensor input accepters, a speed sensor state determiner, a scale estimator, and a position and attitude information corrector. The sub-sensor input accepter accepts an output of a sub-sensor which acquires information regarding a movement amount based on information other than an output value of a speed sensor. The speed sensor state determiner determines whether the output value of the speed sensor is reliable. The scale estimator estimates a size of the movement amount based on at least one of the output value of the speed sensor and an output value of the sub-sensor. The position and attitude information corrector corrects position and attitude information based on the size of the movement amount estimated by the scale estimator.

10 Claims, 5 Drawing Sheets

(56) References Cited

U.S. PATENT DOCUMENTS

| | | | |
|---|---|---|---|
| 5,339,243 A * | 8/1994 | Matsuoka | B62D 5/049 |
| | | | 701/43 |
| 6,281,786 B1 * | 8/2001 | Adachi | G01S 13/862 |
| | | | 367/909 |
| 10,303,168 B2 | 5/2019 | Horita et al. | |
| 10,694,148 B1 * | 6/2020 | Li | G01C 21/1656 |
| 2002/0158507 A1 * | 10/2002 | Eberle | B60T 8/172 |
| | | | 303/122.04 |
| 2007/0076526 A1 * | 4/2007 | Aikyo | G01S 15/86 |
| | | | 367/128 |
| 2007/0088478 A1 | 4/2007 | Mori et al. | |
| 2007/0276565 A1 * | 11/2007 | Kuttenberger | B60R 21/0132 |
| | | | 280/727 |
| 2010/0259420 A1 * | 10/2010 | Von Reyher | G08G 1/165 |
| | | | 701/1 |
| 2010/0283845 A1 * | 11/2010 | Yokochi | G06V 20/58 |
| | | | 382/106 |
| 2012/0044477 A1 * | 2/2012 | Han | G01P 3/366 |
| | | | 356/28 |
| 2012/0095659 A1 * | 4/2012 | Rodrigues | B60K 23/08 |
| | | | 701/69 |
| 2013/0128699 A1 * | 5/2013 | Schmid | G01S 13/46 |
| | | | 367/99 |
| 2014/0236412 A1 * | 8/2014 | Sung | B62D 15/0285 |
| | | | 701/23 |
| 2015/0015702 A1 * | 1/2015 | Yamaguchi | G06V 20/56 |
| | | | 348/142 |
| 2016/0291153 A1 * | 10/2016 | Mossau | G01S 15/931 |
| 2017/0329328 A1 | 11/2017 | Horita et al. | |
| 2018/0089538 A1 * | 3/2018 | Graham | G01S 13/931 |
| 2019/0168550 A1 * | 6/2019 | Kuchler | B60C 23/0464 |
| 2019/0180532 A1 * | 6/2019 | Melson | G07C 5/02 |
| 2019/0347808 A1 * | 11/2019 | Wong | G06T 7/248 |
| 2020/0249347 A1 * | 8/2020 | Suzuki | G01B 21/00 |
| 2020/0264301 A1 * | 8/2020 | Birkedahl | G08G 5/045 |
| 2020/0361432 A1 * | 11/2020 | Hawley | B60T 8/245 |
| 2021/0097707 A1 * | 4/2021 | Oba | G06T 7/579 |

FOREIGN PATENT DOCUMENTS

| | | |
|---|---|---|
| JP | 2012-127896 A | 7/2012 |
| JP | 2014-115247 A | 6/2014 |
| JP | 6298772 B2 | 3/2018 |

\* cited by examiner

POSITION AND ATTITUDE ESTIMATION APPARATUS AND POSITION AND ATTITUDE ESTIMATION METHOD

CROSS REFERENCE TO RELATED APPLICATIONS

This application is based upon and claims the benefit of priority from the prior Japanese Patent Application No. 2019-144616, filed on Aug. 6, 2019, the entire contents of which are incorporated herein by reference.

FIELD

The embodiments of the present invention relate to a position and attitude estimation apparatus, a position and attitude estimation method.

BACKGROUND

Position and attitude estimation of a vehicle itself is very important to enable self-driving of the vehicle. A self-position estimation technology by visual SLAM (simultaneous localization and mapping) using cameras mounted at a periphery of the vehicle has been widely studied. There is a case when a scale is calculated by acquiring information of a speed sensor because a real scale cannot be grasped by the visual SLAM using a single camera. However, when the vehicle is in low-speed, for example, the speed at 1 km per hour, there is a problem that accuracy of the speed sensor decreases to lower accuracy of the position and attitude estimation. Besides, there are similar problems also in the position and attitude estimation through other methods that require the estimation of the scale without being limited to a case when an image is used.

DETAILED DESCRIPTION

According to one embodiment, a position and attitude estimation apparatus includes sub-sensor input accepters, a speed sensor state determiner, a scale estimator, and a position and attitude information corrector. The sub-sensor input accepter accepts an output of a sub-sensor which acquires information regarding a movement amount based on information other than an output value of a speed sensor. The speed sensor state determiner determines whether the output value of the speed sensor is reliable. The scale estimator estimates a size of the movement amount based on at least one of the output value of the speed sensor and an output value of the sub-sensor. The position and attitude information corrector corrects position and attitude information based on the size of the movement amount estimated by the scale estimator.

Embodiments will be explained with reference to the accompanying drawings.

Figure 1:
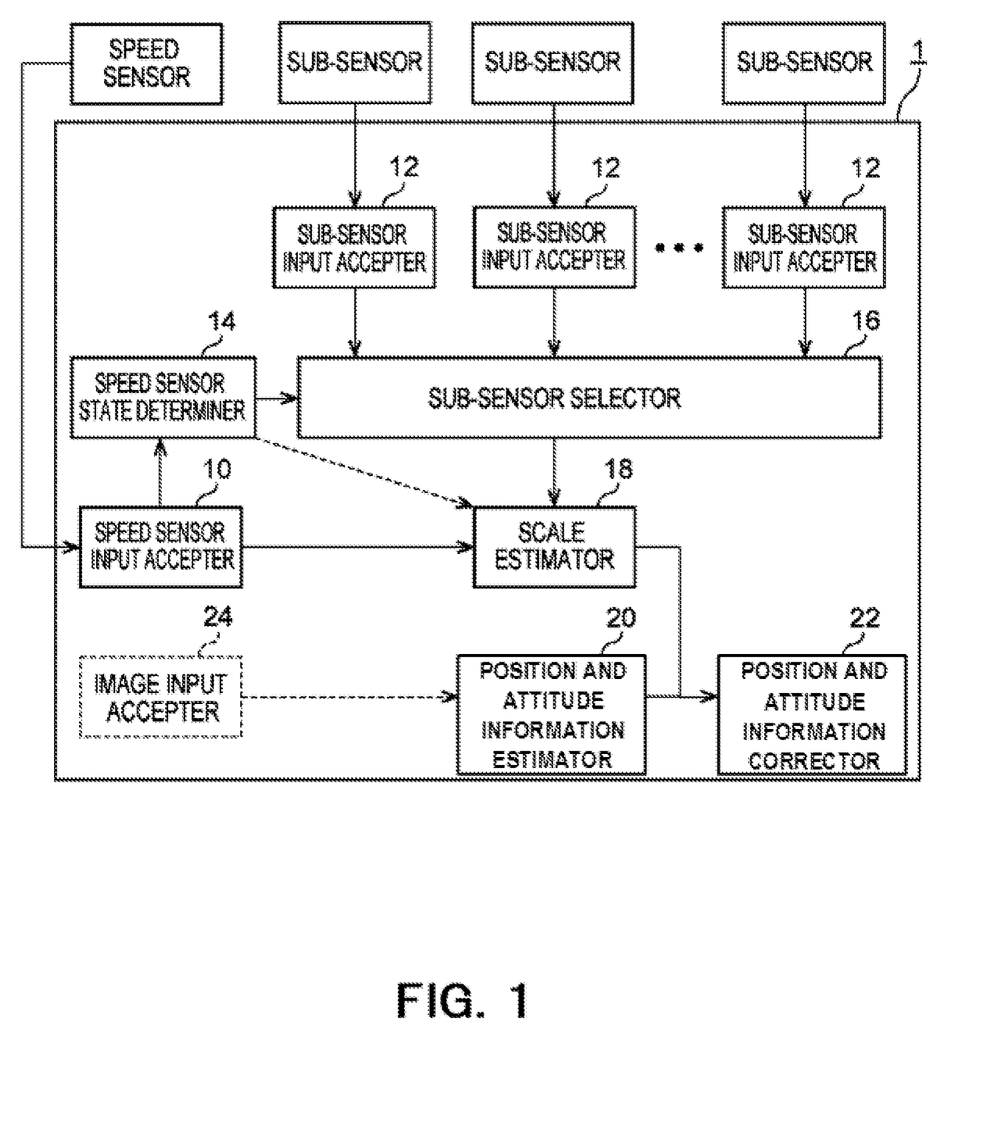
FIG. 1 is a block diagram illustrating functions of a position and attitude estimation apparatus according to an embodiment.

FIG. 1 is a block diagram illustrating functions of a position and attitude estimation apparatus according to this embodiment. A position and attitude estimation apparatus 1 includes a speed sensor input accepter 10, sub-sensor input accepters 12, a speed sensor state determiner 14, a sub-sensor selector 16, a scale estimator 18, a position and attitude information estimator 20, and a position and attitude information corrector 22. Further, an image input accepter 24 may be included. The position and attitude estimation apparatus 1 estimates, for example, a position and an attitude of a vehicle where it is mounted. In the following explanation, the position and attitude estimation apparatus 1 is assumed to be mounted on an automobile, but it is not limited thereto, and the apparatus may be mounted on a robot or the like in addition to a vehicle.

The speed sensor input accepter 10 accepts speed information from a speed sensor of the automobile. The speed sensor is a general sensor, and for example, it may be a sensor including a slit synchronized with a movement of a wheel between a light-emitting device and a light-receiving device. In such a speed sensor, it becomes difficult to acquire accurate speed at a low-speed, for example, when the speed becomes 1 km per hour or less because a detectable minimum rotation angle is fixed. Accordingly, the speed is estimated from another sensor, and the estimation of the position and the attitude is performed by using a more accurate scale estimation result.

The sub-sensor input accepter 12 accepts an input of a sub-sensor being a sensor other than the speed sensor. Here, the sub-sensor means a sensor capable of acquiring information which can be used to measure speed, for example, image information or the like. The sub-sensor is, for example, an ultrasonic sonar, a sensor acquiring a rotation amount and a yaw rate of a wheel, or a sensor such as a camera mounted on a vehicle, and acquires information regarding a movement amount of the vehicle.

The information regarding the movement amount means information capable of acquiring the movement amount of the vehicle from the information. The moving of the vehicle is a concept including the moving in a left-right direction in addition to the moving in a front-back direction of the vehicle. For example, when the rotation amount and the yaw rate of the wheel are acquired, the movement amount of the vehicle can be calculated by using information such as a size of a tire. It is possible to calculate how far the vehicle moved with respect to an obstacle by acquiring a ToF (time of flight) such as ultrasonic waves or pulse light for the obstacle or the like at proper timing. The information regarding the movement amount of the vehicle means an amount capable of directly or indirectly calculating the movement amount of the vehicle by acquiring the information.

The speed may be found based on the movement amount acquired by the sub-sensor in itself, speed information itself may be acquired, or the sub-sensor input accepter 12 may find the speed based on an output value (for example, the movement amount) of the sub-sensor.

The sub-sensor input accepter 12 may be included one by, for example, each kind of the sub-sensor, or may be included one by each sub-sensor. Besides, one sub-sensor input accepter 12 may accept the inputs from a plurality of sub-sensors. As illustrated in FIG. 1, for example, a plurality of sub-sensor input accepters 12 are included in the position and attitude estimation apparatus 1.

The speed sensor state determiner 14 determines whether a speed value output from the speed sensor is a predetermined value (for example, 1 km per hour) or less. A value where the accuracy of the output value from the speed sensor decreases is set as the predetermined value, and the speed sensor state determiner 14 determines that reliability of the output from the speed sensor is low when the value output from the speed sensor is this predetermined value or less.

The speed sensor state determiner 14 determines the reliability based on the case when the value of the speed becomes the predetermined value or less as mentioned above, but it is not limited thereto. For example, the determination may be made by using other parameters in addition to the speed. This determination may be made by a rule base, or by using a neural network model or the like which is trained by machine learning. The training of the model is, for example, conducted such that respective parameter values are stored under various conditions, and when the stored parameter value is input, reliability is output. This training may be conducted by supervised learning, or by unsupervised learning.

The sub-sensor selector 16 selects the output value from any of the sub-sensors mounted on the vehicle when the reliability of the output from the speed sensor is determined to be low. That is, at least one of the sub-sensor input accepters 12 is selected, the value of the speed is acquired from the sub-sensor connected to the sub-sensor input accepter 12, and the value is output as the speed value.

The scale estimator 18 estimates a scale from information of the speed acquired based on information acquired from various sensors. Here, the scale indicates a parameter (magnification) to link between a distance in an image and an actual distance when, for example, the position and attitude estimation is performed by using the image. The scale estimator 18 calculates the scale based on, for example, the value of the speed input from the speed sensor input accepter 10 or the like. A generally used method may be used for the calculation of the scale from the speed information.

When the speed sensor state determiner 14 determines that the value of the speed sensor is unreliable, the scale estimator 18 estimates the scale based on the output of the sub-sensor selected by the sub-sensor selector 16. The scale estimator 18 estimates the scale based on the output of at least one sub-sensor from among a plurality of sub-sensors when the value of the speed sensor is unreliable and the plurality of sub-sensors are included. The scale is estimated by using a generally used algorithm or the like for the output of each sub-sensor also when the output of the sub-sensor is used.

As it has already been described in the explanations of the sub-sensor selector 16 and the scale estimator 18, the scale is estimated by selecting at least one of the sub-sensors when the reliability of the speed sensor is low. That is, when the plurality of sub-sensors are included, the scale may be estimated based on the outputs from two or more sub-sensors.

The position and attitude information estimator 20 estimates position and attitude information from, for example, information of an image acquired to estimate the position and attitude information. The position and attitude information is the information containing, for example, information of a position of the vehicle and information of an attitude of the vehicle. In this embodiment, the position of the vehicle is a concept including a relative position with respect to a position at a certain timing, a position with respect to a road, a running surface, and a parking surface, a position on a map, or the like. The attitude of the vehicle is a concept including a relative vehicle direction or the like with respect to a direction of the vehicle at a certain timing in addition to a general vehicle attitude (an inclination to a road surface, or the like)

The estimation of the position and attitude information is acquired by a sensor other than the sub-sensors. For example, the position and attitude information of the vehicle is estimated from information acquired by the visual SLAM from the image information acquired by the camera and acquired from a GPS (global positioning system), an IMU (inertial measurement unit), and so on. The estimation may be conducted by other generally used methods without being limited to the above.

The position and attitude information corrector 22 corrects the information of the position and the attitude of the vehicle estimated by the position and attitude information estimator 20 based on the value of the scale estimated by the scale estimator 18. In more detail, the position and attitude information corrector 22 corrects the position information and the attitude information of the vehicle based on the value of the scale with higher accuracy than the speed sensor estimated by the scale estimator 18.

The image input accepter 24 is illustrated as an example of installation and accepts an input of a sensor acquiring information which is used when the position and attitude information is estimated. For example, when the visual SLAM is used for the estimation of the position and attitude information, the image input accepter 24 accepts an input of the image information acquired by an image sensor. The position and attitude information estimator 20 estimates the position and the attitude of the vehicle based on the input value. When the reliability of the output of the speed sensor is high, the information may be one capable of estimating the position or the like of the vehicle by using the output value of the speed sensor.

Note that the aforementioned explanation and drawings are listed as an example, and the invention is not necessarily limited to the configuration. For example, the speed sensor state determiner 14 is not necessarily directly output the reliability to the scale estimator 18, and a sensor that performs the scale selection may be determined through the speed sensor input accepter 10 or the sub-sensor selector 16. For example, when the reliability of the speed sensor is low, the speed sensor input accepter 10 may not output the speed value to the scale estimator 18. In the same case, the sub-sensor selector 16 may notify the scale estimator 18 that the reliability of the speed sensor is low together with the output value of the selected sub-sensor.

It is not limited that the sub-sensor selector 16 outputs the output value from the sub-sensor input accepter 12 to the scale estimator 18. That is, the sub-sensor selector 16 may play a role as a switch, and may be a means to connect between the scale estimator 18 and the selected sub-sensor input accepter 12. In other words, the output value of the sub-sensor input accepter 12 may be directly input to the scale estimator 18.

Figure 2:
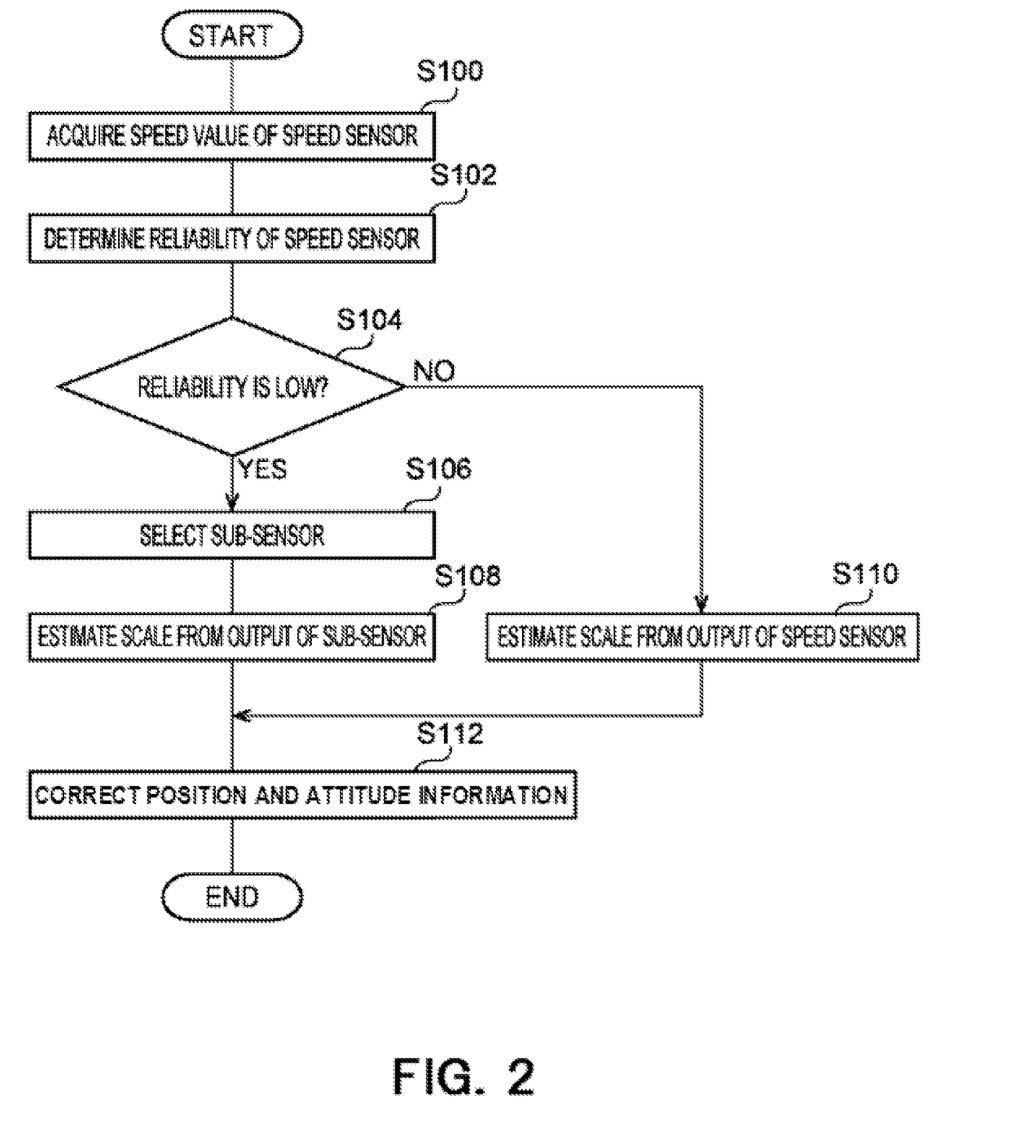
FIG. 2 is a flowchart illustrating processes of the position and attitude estimation apparatus according to an embodiment.

FIG. 2 is a flowchart illustrating a flow of processes of the scale estimation using the sub-sensors in the position and attitude estimation apparatus 1 according to this embodiment. The processes of the scale estimation are explained by using this flowchart.

First, the speed value output from the speed sensor is acquired through the speed sensor input accepter 10 (S100). This speed value is output to the speed sensor state determiner 14.

The speed sensor state determiner 14 receiving the speed value determines the reliability of the speed sensor (S102). The reliability is determined to be low when, for example, the output value of the speed sensor becomes a predetermined speed or less. As mentioned above, the reliability may be output by inputting numeric values or the like including other parameters to a neural network which is trained by machine learning. The determination of the reliability is output to, for example, the sub-sensor selector 16. Further, the determination may be fed back to the speed sensor input accepter 10 or may be output to the scale estimator 18 in addition to the sub-sensor selector 16. The reliability may be binary of low and high, a multi-value including an intermediate value such as, for example, relatively low, normal, relatively high, or a real value in a certain range.

Next, the process is branched depending on whether the reliability is low or high (S104). When the reliability is low (S104: YES), the sub-sensor selector 16 selects the sub-sensor input accepter 12 inputting a value to be used to conduct the scale estimation (S106). For example, the sub-sensor selector 16 transmits the input from the selected sub-sensor input accepter 12 to the scale estimator 18. The sub-sensor selector 16 may select the sub-sensor input accepter 12 based on various parameters such as a steering angle received through a CAN (controller area network) or the like. As another example, when the reliability takes the multi-value, the sub-sensor selector 16 may select a sensor used for the scale estimation from among the sub-sensors based on the reliability.

Next, the scale estimator 18 estimates the scale based on the output value from the selected sub-sensor (S108). The estimation of the scale is conducted based on characteristics of each sub-sensor. Kinds of the sub-sensors and the estimation of the scale corresponding to each sub-sensor may be described later.

Meanwhile, when the reliability is high (S104: NO), the scale estimator 18 estimates the scale by using the output value of the speed sensor input to the speed sensor input accepter 10 (S110). For example, the movement amount or the like is calculated based on the acquired image and speed to acquire the scale.

Next, the position and attitude information corrector 22 corrects the position and attitude information for the estimation value of the acquired position and attitude information by using the scale which is estimated by the scale estimator 18 based on the output value of each sensor (S112).

As mentioned above, according to this embodiment, the correction of the position and attitude information with high reliability and accuracy is enabled by estimating the scale based on not the speed output from the speed sensor but the output from the sensor with higher reliability when the reliability of the speed value output from the speed sensor is low, for example, when the speed is slower than the predetermined speed. It becomes thereby possible to acquire the information of the position and attitude of the vehicle with high accuracy even in a case when, for example, the position estimation of the SLAM by a monocular camera is conducted, during driving at a reduced speed, at the timing of parking, and the like.

Next, the sub-sensors are explained. The sub-sensors are sensors other than what is called a speed sensor, and for example, an ultrasonic sensor, a rotation angle sensor acquiring a rotation angle of each of four wheels, an image sensor such as a camera mounted on a vehicle, and the like. The sub-sensor input accepter 12 accepts the input from at least one sensor from among these sensors.

Figure 3:
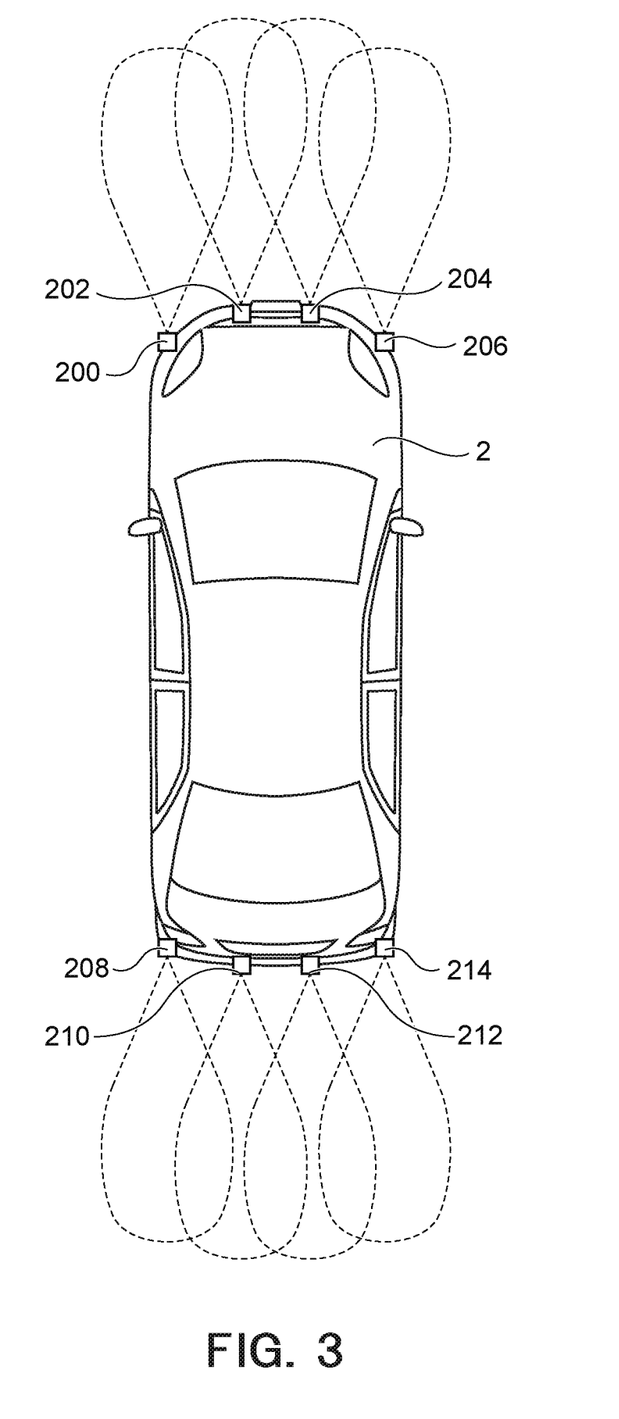
FIG. 3 is a diagram illustrating an example of sub-sensors according to an embodiment.

First, a case when the ultrasonic sensor is selected is explained. FIG. 3 is a diagram illustrating an installation example of the ultrasonic sensors in a vehicle. A vehicle 2 includes, for example, ultrasonic sensors 200, 202, 204, 206, 208, 210, 212, and 214 emitting ultrasonic waves toward an outside of the vehicle and receiving reflection of the emitted ultrasonic waves. Each ultrasonic sensor emits ultrasonic waves in a range indicated by, for example, a dotted line, senses reflected waves from an object when the object exists in the range, and measures a distance from the sensor to the object based on a time from the emission to the sensing.

The ultrasonic sensors 200, 202, 204, and 206 are installed such that the ultrasonic waves are emitted toward a front side of the vehicle 2, and the ultrasonic sensors 208, 210, 212, and 214 are installed such that the ultrasonic waves are emitted toward a back side of the vehicle 2. The ultrasonic sensors 202, 204, 210, and 212 are each installed near a center on a short side of the vehicle 2 to detect obstacles or the like to a front face and a back face of the vehicle, and the ultrasonic sensors 200, 206, 208, and 214 are each installed at a position near a side face of the vehicle 2 at an outer side than the above sensors.

These ultrasonic sensors input sensed information to a computer controlling the vehicle through the sub-sensor input accepter 12. All of the ultrasonic sensors may communicate through the same sub-sensor input accepter 12, or communicate through separated sub-sensor input accepters 12.

The ultrasonic sensor is able to measure a distance to an object reflecting the ultrasonic waves. That is, when the object does not move with respect to a road, the scale estimation can be conducted by using a change of the distance to the object as a distance where the vehicle moves instead of the speed.

The selection of which sensor is to be used from among a plurality of ultrasonic sensors is determined based on, for example, a direction where the vehicle moves. An example regarding the movement of the vehicle and the used sensor is described below.

When the vehicle 2 moves straight forward, at least one of the ultrasonic sensors 202, 204 is selected. When the vehicle 2 moves straight backward, at least one of the ultrasonic sensors 210, 212 is selected. When the vehicle 2 turns to the left forward, the ultrasonic sensor 200 is selected. When the vehicle 2 turns to the right forward, the ultrasonic sensor 206 is selected. When the vehicle 2 turns to the left backward, the ultrasonic sensor 208 is selected. When the vehicle 2 turns to the right backward, the ultrasonic sensor 212 is selected.

When the ultrasonic sensor is selected, the ultrasonic sensor which emits ultrasonic waves in a direction near a traveling direction of the vehicle 2 is selected as stated above. By selecting the sensor which is near the direction where the vehicle 2 moves, the ultrasonic waves reflected from the object can be received with high accuracy, resulting in that a moving distance of the vehicle 2 can be acquired with higher accuracy. It is possible to determine whether the vehicle moves forward, backward, turns to the right or left by acquiring, for example, a gear state, a rotation angle of steering, a degree of pressing an accelerator, and so on through the CAN or the like.

Next, a case when a rotation amount or the like of the wheel is selected is explained. There is a case when sensors acquiring the rotation amount of each tire with respect to an axle and a yaw rate representing a turning amount of the vehicle are mounted on an automobile. For example, the rotation amount sensor measures the rotation amount by using an encoder at the wheel. The scale can be estimated by selecting output values of the rotation amount sensor and the yaw rate sensor.

The speed of the vehicle 2 can be estimated by acquiring the rotation amount of the wheel and the turning angle of the vehicle 2 from these sensors. The movement amount of the vehicle 2 is acquired from the speed, and the scale estimation is conducted. When these sensors are mounted on each of the four wheels, for example, the sensor which outputs a rotation amount with a large value is selected from among combinations of the four sensors. That is, for example, the sensor which is attached to the wheel whose rotation amount is larger than those of other wheels is selected.

The speed and the movement amount can be acquired with high accuracy by selecting the sensor whose value of the rotation amount is large as stated above because a quantization error of the encoder becomes smaller as the rotation amount measured by the encode becomes larger.

Figure 4:
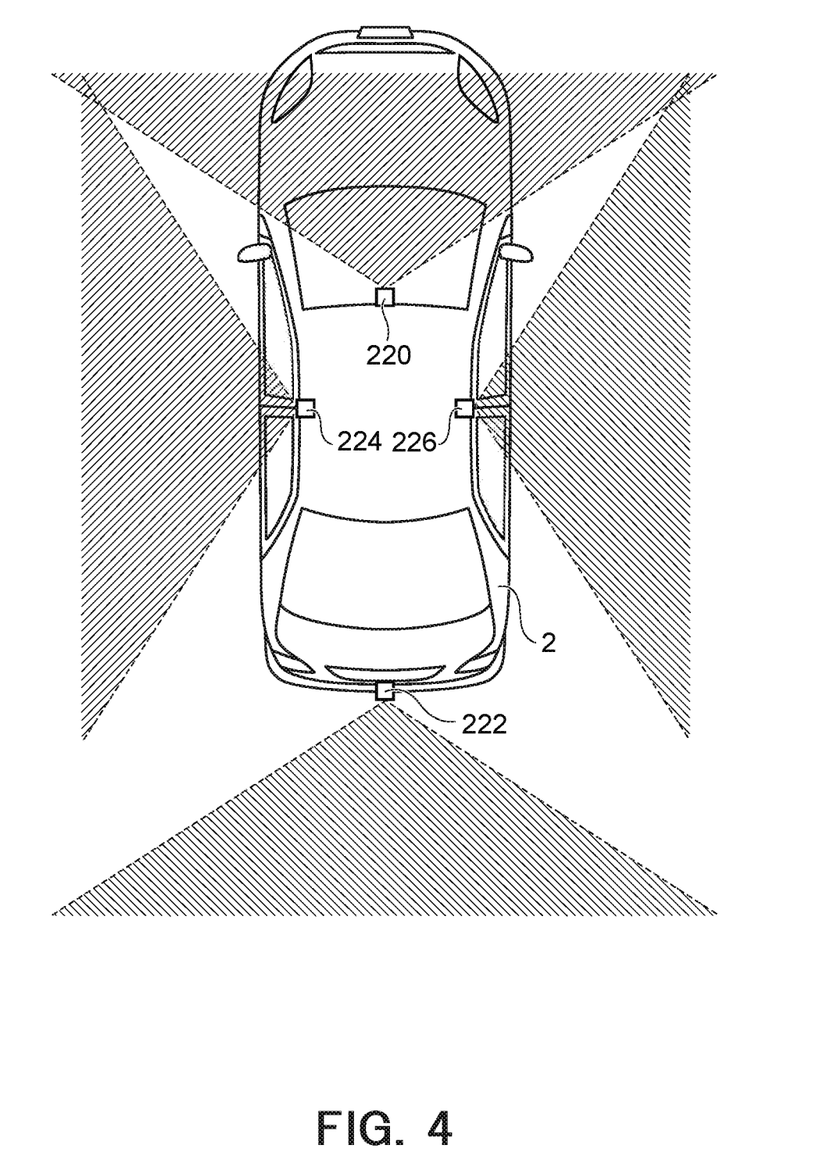
FIG. 4 is a diagram illustrating an example of sub-sensors according to an embodiment.

Next, a case when the camera is selected is explained. FIG. 4 is a diagram illustrating an installation example of cameras in a vehicle. The vehicle 2 includes, for example, cameras 220, 222, 224, and 226. These cameras are mounted such that the camera 220 photographs a vehicle front side, the camera 222 photographs a vehicle back side, the camera 224 photographs a vehicle left side, and the camera 226 photographs a vehicle right side. In this diagram, one camera is mounted per one direction, but it is not limited thereto, and a plurality of cameras may be included per one direction. Cameras each acquire a state in an oblique direction may be installed.

As illustrated in the diagram, each camera acquires an image of an area extending a range illustrated by oblique lines. When a camera is selected, the scale estimation is conducted based on the image acquired by the selected camera. For example, the movement amount is calculated by acquiring optical flow from images acquired at different timings.

Concretely, the optical flow in a state at high-speed and capable of securing enough reliability is acquired at each camera, and a size of the optical flow and the movement amount of the vehicle at that time are stored in non-illustrated storage. Then when the camera is selected as the sub-sensor, the movement amount when the reliability of the vehicle speed is low is estimated based on a size ratio between the stored optical flow and current optical flow and the stored movement amount of the vehicle.

For example, the camera which is installed to photograph a direction near a vertical direction with respect to a moving direction is selected. When the vehicle 2 moves forward or backward, at least one of the cameras 224, 226 is selected. When the vehicle 2 is turning, at least one of the cameras 220, 222 or the camera which is provided at a side surface in reverse to the turning direction may be selected. A relation between the optical flow and the movement amount at each camera may be stored in the storage in accordance with respective states such as, for example, straight drive or turning.

As mentioned above, when the camera is selected, the movement amount with higher accuracy can be estimated by selecting the camera capable of acquiring large optical flow with respect to the traveling direction of the vehicle 2. For example, when the camera is not mounted on a lateral side, the camera 222 at the back side may be selected at the timing of driving forward, and the camera 220 at the front side may be selected at the timing of driving backward. The more optical flows can be used by using the camera photographing a direction in reverse to the traveling direction.

The selection of the sensor in the above-description may include any state from among sensing information by activating the selected sensor, using the sensed information of the selected sensor from among activated sensors which are the same kind as the selected sensor, or using the sensed information of the selected sensor from among activated arbitrary sensors. That is, there is no dependency between the selection state and activation states of other sensors, and it is only required that at least the selected sensor is activated and the sensed information is in an acquirable state.

The sub-sensor selector 16 selects the sub-sensor used for the scale estimation from among the above-stated sub-sensors. When a plurality of kinds of sub-sensors are provided, for example, the sensor provided at which position is to be used is selected from among one kind of sensors based on the above-stated states. The sensor provided at a predetermined position may be selected from among each of the plurality of kinds of sensors based on the above-stated states by using the plurality of kinds of sensors. Concretely, the scale estimation may be performed by selecting the ultrasonic sensor in the vicinity of the vehicle center front side and the camera at the vehicle lateral side when the ultrasonic sensors and cameras are mounted and the vehicle drives forward.

The sub-sensor selector 16 selects the kind of the sub-sensor and the sensor at which position is to be used among each kind of sub-sensors based on the state at the timing when the scale estimation is conducted. The kind of the sub-sensor may be determined based on, for example, the reliability as stated above, all of the usable sensors may be selected, or may be preferentially selected from among predetermined sensors. The kind and the position of the sub-sensor may be selected based on the states such as the steering, accelerator, and gear.

Hereinabove, the case when the sub-sensor is used is explained, but it is not limited thereto. For example, when the reliability of the output value of the speed sensor is low, the size of the movement amount may be estimated while setting the speed as a predetermined value without using the sub-sensor. Such a process enables to reduce a calculation amount and to conduct the scale estimation under a state where a more safety drive is possible because, for example, a moving speed is set to a predetermined low-speed value which is higher than the original speed.

Figure 5:
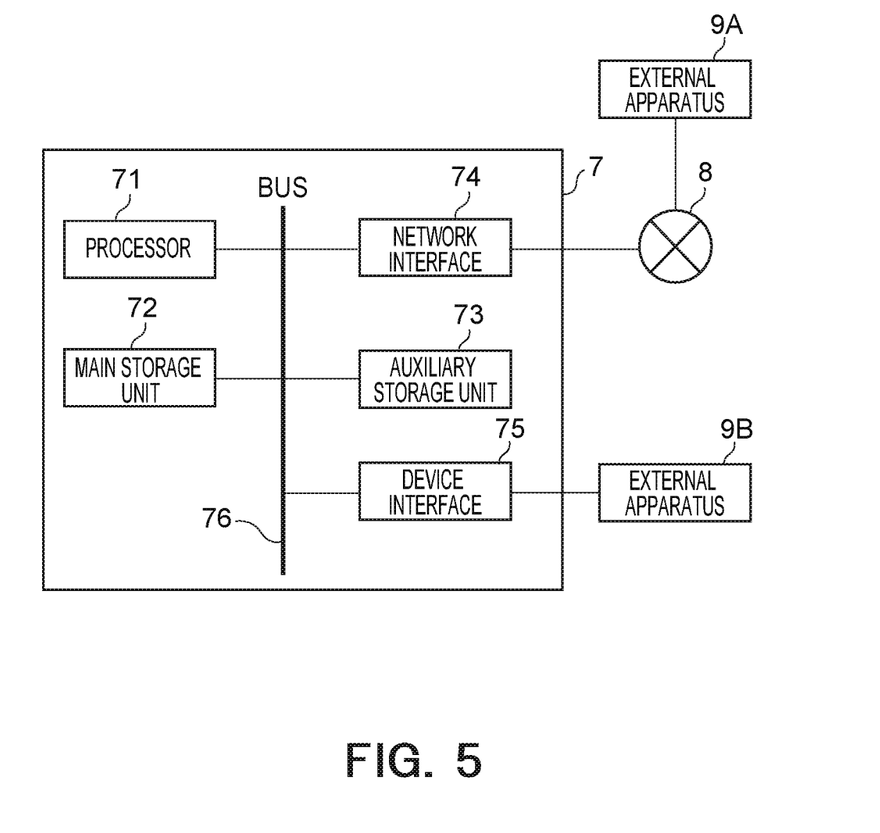
FIG. 5 is a diagram illustrating an example of a hardware configuration of the position and attitude estimation apparatus according to an embodiment.

FIG. 5 is a block diagram illustrating an example of hardware implementation of the position and attitude estimation apparatus 1 in each embodiment. The position and attitude estimation apparatus 1 includes a processor 71, a main storage unit 72, an auxiliary storage unit 73, a network interface 74, and a device interface 75, and a device 7 where these components are connected through a bus 76 is formed. The device 7 may be a computer device that is independently activated in itself or may be an accelerator which is built in an independently activating computer device or connected thereto.

The device 7 in FIG. 5 includes each component one by one, but the same components may be included in plural. One device 7 is illustrated, but software may be installed on a plurality of computer devices, and each of the plurality of computer devices may execute different parts of the processes of the software.

The processor 71 is an electronic circuit operating as a processing circuit including a control unit and an arithmetic unit of a device. The processor 71 performs arithmetic processing based on data and programs input from each unit and the like of an internal configuration of the device 7 and outputs arithmetic results and control signals to each unit or the like. Concretely, the processor 71 controls each component configuring the device 7 by executing an OS (operating system) of the device 7, applications, and so on. The processor 71 is not particularly limited as long as the above processes can be performed. The position and attitude estimation apparatus 1 and each component thereof may be enabled by the processor 71.

The main storage unit 72 is a storage unit storing commands executed by the processor 71, various data, and the like, and information stored in the main storage unit 72 is directly read by the processor 71. The auxiliary storage unit 73 is a storage unit other than the main storage unit 72. These storage units each mean an arbitrary electronic component capable of storing electronic information and may be a memory and storage. There are a volatile memory and a nonvolatile memory in the memories, but both memories are usable. A memory to store various data in the position and attitude estimation apparatus 1 may be enabled by the main storage unit 72 or the auxiliary storage unit 73. For example, the storage may be mounted on the main storage unit 72 or the auxiliary storage unit 73. As another example, when an accelerator is further included in the device 7, the storage may be mounted in a memory included in the accelerator.

The network interface 74 is an interface to connect to a communication network 8 through wireless or wired. An interface compatible with an existing communication protocol may be used as the network interface 74. Information may be exchanged with an external apparatus 9A which is communication-connected through the communication network 8 by the network interface 74.

The external apparatus 9A includes, for example, a stereo camera, a motion capture, an output destination device, an external sensor, an input source device, and so on. The external apparatus 9A may be an apparatus having a part of functions of the components of the position and attitude estimation apparatus 1. The device 7 may transmit/receive a part of processing results of the position and attitude estimation apparatus 1 through the communication network 8 such as a cloud service.

The device interface 75 is an interface such as a USB (universal serial bus) which is directly connected to an external apparatus 9B. The external apparatus 9B may be an external storage medium or a storage unit. The storage may be enabled by the external apparatus 9B.

The external apparatus 9B may be an output unit. The output unit may be, for example, a display unit displaying images, a unit outputting sounds or the like, and so on. For example, there are an LCD (liquid crystal display), a CRT (cathode ray tube), a PDP (plasma display panel), a speaker, and so on, but it is not limited thereto. The external apparatus 9B may be a component of an automobile controlled through the CAN.

The external apparatus 9B may be an input unit. The input unit includes devices such as a keyboard, a mouse, and a touch panel to give information input through these devices to the device 7. Signals from the input unit are output to the processor 71.

In all of the descriptions, at least a part of the position and attitude estimation apparatus 1 may be formed by hardware, or formed by software and a CPU or the like may execute through information processing of software. When the apparatus is formed by the software, programs that carry out functions of the position and attitude estimation apparatus 1 and at least a part of the functions may be stored in a storage medium such as a flexible disk and a CD-ROM, and they may be read and executed by a computer. The storage medium is not limited to a detachable medium such as a magnetic disk and an optical disk and may be a fixed-type storage medium such as a hard disk device and a memory. That is, it may be one where information processing by software is concretely implemented by using hardware resources. Further, processing by the software may be implemented on a circuit such as an FPGA and executed by hardware.

For example, a computer may be used as the apparatus of the embodiment by the computer reading dedicated software stored in a computer-readable storage medium. A kind of the storage medium is not particularly limited. Besides, a computer may be used as the apparatus of the embodiment by the computer installing dedicated software which is downloaded through a communication network. The information processing by software can be concretely implemented by using hardware resources.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, in the description of the specification, expressions of "or less", "or more", "smaller than", "larger than", and the like may be respectively rewritten into "smaller than", "larger than", "or less", "or more", and the like.

The invention claimed is:

1. A position and attitude estimation apparatus for a vehicle, comprising a processor configured to execute a plurality of software modules, the plurality of software modules comprising:

a sub-sensor input accepter which accepts an output of sub-sensors acquiring information regarding a movement amount of the vehicle based on information other than an output value of a speed sensor;

a speed sensor state determiner which determines whether the output value of the speed sensor is reliable;

a scale estimator which estimates a size of the movement amount of the vehicle based on at least one of the output value of the speed sensor and an output value of at least one of the sub-sensors while setting a speed of the vehicle as a predetermined value when the output value of the speed sensor is unreliable; and a position and attitude information corrector which corrects position and attitude information of the vehicle based on the size of the movement amount estimated by the scale estimator, wherein the sub-sensors include one kind of sensor such that each sub-sensor of the one kind acquires a same kind of information, the sub-sensor input accepter accepts at least one of output from an ultrasonic sensor, outputs from a rotation amount sensor of a wheel and a yaw rate sensor, and an output from a camera, and the plurality of software modules further comprises a sub-sensor selector which selects the output of the sub-sensors from outputs including information acquired by the one kind of sensor, based on at least one of types of movement of the vehicle or an external object, used for estimation of the movement amount when the output value of the speed sensor is unreliable.

2. The position and attitude estimation apparatus according to claim 1, wherein:
the sub-sensor selector selects the output from the ultrasonic sensor, wherein the ultrasonic sensor emits ultrasonic waves in a direction near a traveling direction, from among a plurality of ultrasonic sensors when the sub-sensor input accepter accepts the output from the ultrasonic sensor.

3. The position and attitude estimation apparatus according to claim 1, wherein:
the scale estimator estimates the size of the movement amount based on a change in a distance which is obtained by the ultrasonic sensor emitting ultrasonic waves to the external object to measure the distance to the external object when the sub-sensor selector selects the output of the ultrasonic sensor.

4. The position and attitude estimation apparatus according to claim 1, wherein:
the sub-sensor selector selects outputs from a rotation amount sensor of a wheel whose rotation amount is larger than rotation amounts of other wheels and the yaw rate sensor when the sub-sensor input accepter accepts the outputs from a rotation amount sensor of a wheel and the yaw rate sensor.

5. The position and attitude estimation apparatus according to claim 1, wherein:
the scale estimator estimates the size of the movement amount based on a rotation amount and a turning angle of the wheel when the sub-sensor selector selects the outputs from the rotation amount sensor and the yaw rate sensor.

6. The position and attitude estimation apparatus according to claim 1, wherein:
the sub-sensor selector selects the output from the camera, wherein the camera acquires an image in a direction nearly perpendicular to a traveling direction, from among a plurality of cameras when the sub-sensor input accepter accepts the output from the camera.

7. The position and attitude estimation apparatus according to claim 1, wherein:
the scale estimator estimates the size of the movement amount based on a size of optical flow when the sub-sensor selector selects the output from the camera.

8. A position and attitude estimation apparatus for a vehicle, comprising a processor configured to execute a plurality of software modules, the plurality of software modules comprising:
a speed sensor state determiner which determines whether an output value of a speed sensor is reliable;
a scale estimator which estimates a size of a movement amount of the vehicle while setting a speed of the vehicle as a predetermined value when the output value of the speed sensor is unreliable; and
a position and attitude corrector which corrects position and attitude of the vehicle based on the size of the movement amount estimated by the scale estimator.

9. A position and attitude estimation method for a vehicle, comprising:
accepting, by a processor, an output of sub-sensors which estimates a movement amount of the vehicle based on information other than an output value of a speed sensor;
determining, by the processor, whether the output value of the speed sensor is reliable;
estimating, by the processor, a size of the movement amount of the vehicle based on at least one of the output value of the speed sensor and an output value of the sub-sensor while setting a speed of the vehicle as a predetermined value when the output value of the speed sensor is unreliable; and
correcting, by the processor, position and attitude information of the vehicle based on the size of the movement amount estimated, wherein
the sub-sensors include one kind of sensor such that each sub-sensor of the one kind acquires a same kind of information,
the processor accepts at least one of output from an ultrasonic sensor, outputs from a rotation amount sensor of a wheel and a yaw rate sensor, and an output from a camera, and
the processor selects the output of the sub-sensors from outputs including information acquired by the one kind of sensor, based on at least one of types of movement of the vehicle or an external object, used for estimation of the movement amount when the output value of the speed sensor is unreliable.

10. The position and attitude estimation apparatus according to claim 1, wherein
the types of the movement of the vehicle comprise moving forward, moving backward, or turning right or left.

* * * * *